(12) United States Patent
Buchanan

(10) Patent No.: US 8,793,793 B2
(45) Date of Patent: Jul. 29, 2014

(54) METHOD AND APPARATUS FOR IMPROVED DIGITAL RIGHTS MANAGEMENT

(75) Inventor: Eric Buchanan, Campbell, CA (US)

(73) Assignee: Samsung Information Systems America, Inc., San Jose, CA (US)

( * ) Notice: Subject to any disclaimer, the term of this patent is extended or adjusted under 35 U.S.C. 154(b) by 0 days.

(21) Appl. No.: 13/267,810

(22) Filed: Oct. 6, 2011

(65) Prior Publication Data

US 2013/0091563 A1   Apr. 11, 2013

(51) Int. Cl.
*G06F 11/00* (2006.01)

(52) U.S. Cl.
USPC .............................................. 726/23; 726/26

(58) Field of Classification Search
USPC ................... 726/7, 17, 18, 19, 22, 23, 26; 705/50–51
See application file for complete search history.

(56) References Cited

U.S. PATENT DOCUMENTS

| | | | |
|---|---|---|---|
| 5,761,651 A * | 6/1998 | Hasebe et al. | 705/400 |
| 5,905,797 A * | 5/1999 | McRae | 705/57 |
| 5,925,127 A * | 7/1999 | Ahmad | 726/31 |
| 5,978,842 A * | 11/1999 | Noble et al. | 709/218 |
| 6,144,745 A | 11/2000 | Akiyama et al. | |
| 6,671,608 B2 | 12/2003 | McKenzie et al. | |
| 7,231,516 B1 | 6/2007 | Sparrell et al. | |
| 7,984,320 B2 | 7/2011 | Betouin et al. | |
| 8,145,688 B2 | 3/2012 | Reynolds | |
| 8,214,653 B1 | 7/2012 | Marr et al. | |
| 8,239,961 B2 | 8/2012 | Strohwig et al. | |
| 8,272,058 B2 | 9/2012 | Brennan | |
| 8,290,874 B2 | 10/2012 | Evans et al. | |
| 8,689,010 B2 | 4/2014 | Alkove et al. | |
| 2002/0029351 A1 | 3/2002 | Deng | |
| 2003/0187794 A1 * | 10/2003 | Irwin et al. | 705/40 |
| 2006/0100983 A1 | 5/2006 | Atkinson et al. | |
| 2007/0244827 A1 | 10/2007 | Scandelore et al. | |
| 2009/0151006 A1 | 6/2009 | Saeki et al. | |
| 2009/0249108 A1 * | 10/2009 | Betouin et al. | 713/502 |
| 2009/0287942 A1 * | 11/2009 | Betouin et al. | 713/194 |
| 2010/0161387 A1 * | 6/2010 | Harrang et al. | 705/10 |
| 2011/0035806 A1 | 2/2011 | Kramer et al. | |
| 2013/0004142 A1 | 1/2013 | Grab et al. | |
| 2013/0007467 A1 | 1/2013 | Chan et al. | |
| 2013/0007471 A1 | 1/2013 | Grab et al. | |

OTHER PUBLICATIONS

U.S. Non-Final Office Action for U.S. Appl. No. 13/301,791 (357314-991261) mailed Oct. 24, 2013.
U.S. Final Office Action for U.S. Appl. No. 13/301,791 mailed Feb. 28, 2014.

* cited by examiner

*Primary Examiner* — Samson Lemma
(74) *Attorney, Agent, or Firm* — Kenneth L. Sherman, Esq.; Michael Zarrabian, Esq.; Sherman & Zarrabian LLP

(57) ABSTRACT

A method and apparatus for improved digital rights management is provided.

16 Claims, 7 Drawing Sheets

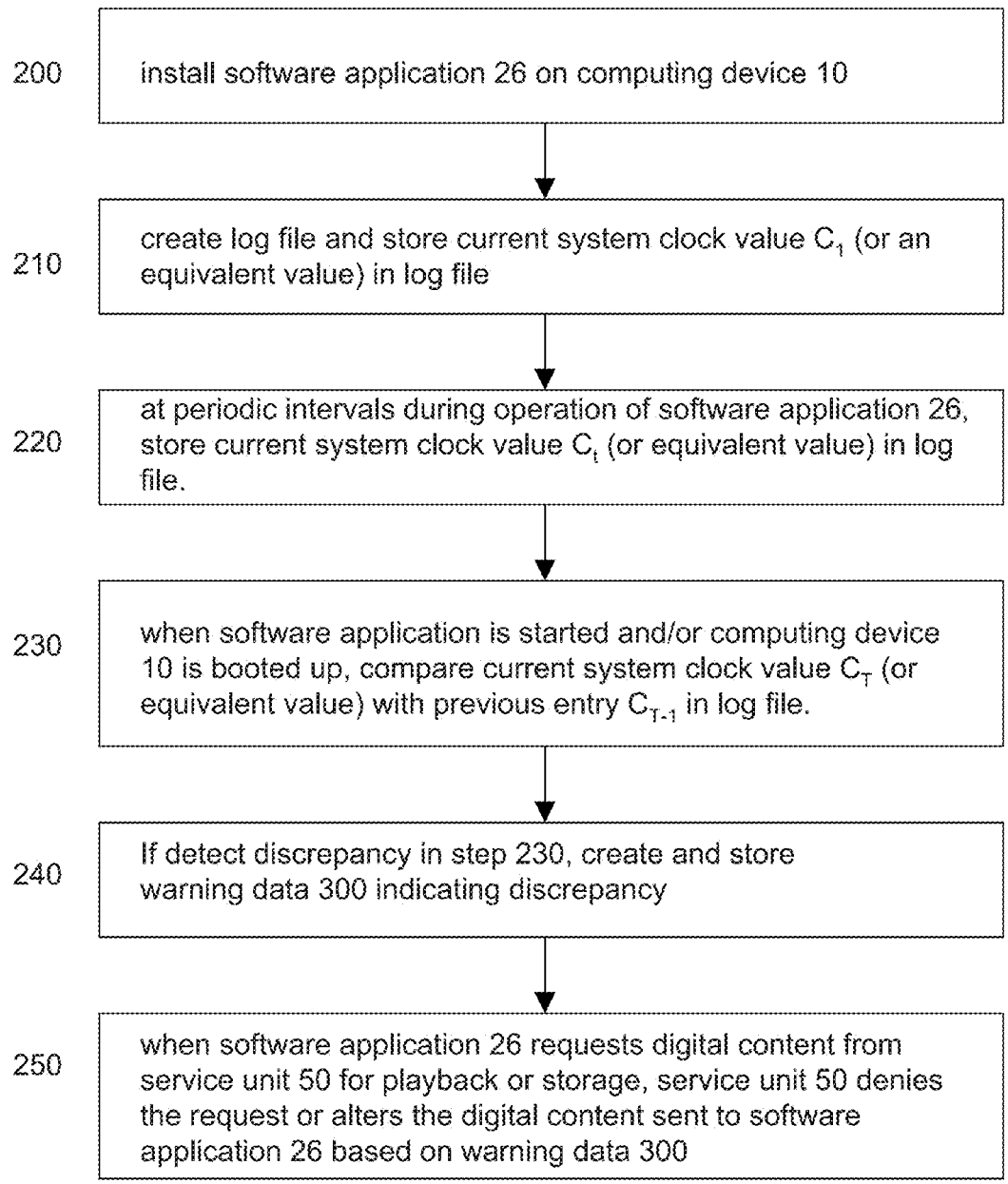

METHOD AND APPARATUS FOR IMPROVED DIGITAL RIGHTS MANAGEMENT

FIELD

The disclosure relates generally to an improved method and apparatus for digital rights Management.

BACKGROUND

In recent years, mobile devices (such as cellular phones, PDAs, iPhones® and iPad® by Apple Computer®, and Droid® devices by Google® and others) have become more powerful than prior generations of mobile devices and now offer additional functionality beyond just voice communication. For instance, many mobile devices today allow users to perform web browsing on the Internet, receive emails, and store and play video and audio content. Such devices contain increasingly powerful processors and enhanced video and audio capability. It is typical now for users to store audio, video, and other data files on numerous computing devices, including mobile devices. For example, a user might store an MP3 file containing a song on his or her mobile device, on a PC at home, in a cloud server, or on other computing devices. This environment is presenting increasingly complex challenges in the realm of digital rights management, whereby copyright owners (such as record labels and movie studios) attempt to prevent unauthorized digital copies of copyrighted works from being made.

Record labels and movie studios often work in conjunction with software companies to create applications that facilitate the use, storage, or sharing of digital content owned by the record label or movie studio. For example, in the realm of computing devices, record labels and movie studios will work with software companies to validate and approve the proposed software application. Although the record label or movie studio may trust that the proposed software application is not designed to allow unauthorized copies of digital content to be created, they often want additional assurances that the software application will not be tampered with by knowledgeable users, such as hackers, who wish to create unauthorized copies. Thus, record labels and movie studios want to be able to detect if the application on a certain computing device has been altered from its original state, which might suggest that a "hacker" had changed the software and is intended to create unauthorized copies of the content once it is loaded onto the computing device. Record labels and movie studios also want to be able to detect if the computing device itself or its operating system has been tampered with in a way that might enable a user to create unauthorized copies.

Record labels and movie studios sometimes provide licenses to play digital content subject to certain time restrictions. For example, a customer might purchase a license to watch a video within a 7-day "rental window" after the initial purchase to be completed within a 24-hour "play window" after the user initially begins playing the digital content. If a user purchases a license on Sunday at 7 pm, that user would then be permitted to watch the video at any point up until the following Sunday at 7 pm, but once the user started watching the video, he or she would need to complete the viewing within 24 hours. This is a standard licensing practice.

One challenge of this business model is that a customer can attempt to "trick" the system by purchasing a license from a computing device and then changing the system clock on the computing device, which the computing device and its applications utilize to derive the current date and time. For example, a user could purchase a time-restricted license and then change the system clock on the computing device so that he or she could have a rental window larger than 7 days in which to watch the video. Or, the user could start watching the video and then change the date of the device to an earlier date, so that he or she could view the video in a play window larger than 24 hours.

What is needed is a mechanism to ensure that altering the system clock on a computing device will not change the effective length of temporal rental windows and play windows for the playing of digital content. What is further needed is a mechanism to detect alterations to the system clock on a computing device to enhance the digital rights management for copyrighted works played on the computing device.

SUMMARY

In accordance with the disclosure, a method and apparatus for improved digital rights management are disclosed.

In one embodiment, the system keeps track of the beginning and end points of each rental window instead of just one of those points as is currently the case in the prior art. For example, rather than just identifying Sunday. Oct. 9, 2011, as the end point of a 7-day rental window, the system would also store the date of Sunday, Oct. 2, 2011, as the beginning point of the 7-day rental window. Similarly, once a user starts playing the digital content, the system would store the beginning date and time when the playing commenced, as well as the end date and time. If a user tried to alter the date and time of his or her device, the overall length of the effective rental window and play window would not change.

In another embodiment, an application running on a computing device maintains a record of the system clock at various points in time, unbeknownst to the user. The application stores the system clock value (which can be used to derive the date and time) of the device in a log tile each time the device is booted up. The application then compares the current system clock value with the last system clock value stored in the log file. If there is an inconsistency (such as the current system clock value being lower that the last system clock value stored in the log file), then the application will create data indicating the inconsistency, and this data optionally can be used to deny future requests from that device to obtain digital data or to restrict the type of digital data that can be obtained by that device.

BRIEF DESCRIPTION OF THE DRAWINGS

FIG. 7 is a flow diagram illustrating a method that prevents a computing device from obtaining digital data if its system clock has been altered.

DETAILED DESCRIPTION OF ONE OR MORE EMBODIMENTS

Figure 1:
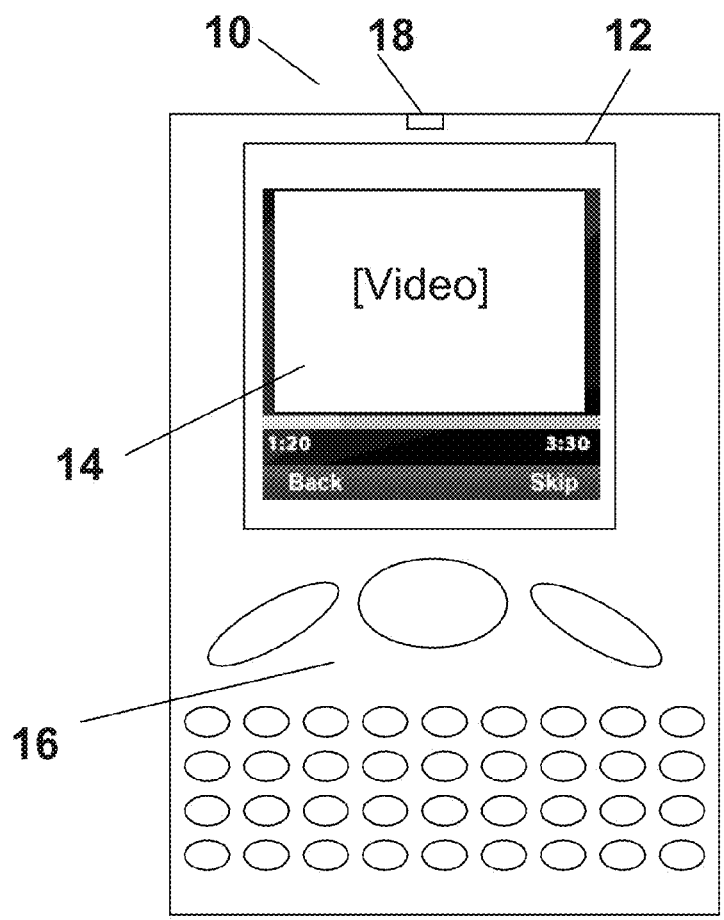
FIG. 1 is a depiction of an exemplary computing device

FIG. 11 depicts an exemplary computing device 10. In this example, computing device 10 includes a video screen 12, input/output device 16, such as a keypad or a touchscreen, and speaker 18. Video screen 12 can display still and moving video as well as text. Video screen 12 can display applications (such as a video player or web browser) in a window 14. Video screen 12 optionally can have touchscreen functionality, and in that event, computing device 10 might not contain keypad. 16. Computing device 10 can be a PDA, mobile phone, Blackberry® by RIM®, iPhone® or iPad® by Apple Computer®, a Droid® device by Google® or others, a desktop computer, notebook computer, tablet, server, or any other computing device.

Figure 2:
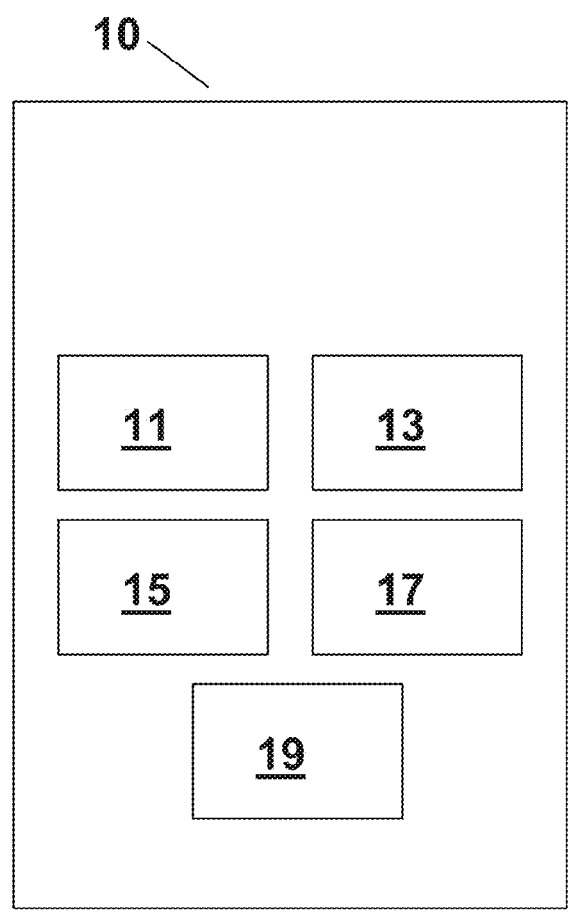
FIG. 2 is a depiction of exemplary hardware components of a computing device.

FIG. 2 depicts exemplary hardware components contained within an exemplary computing device 10. In this example, computing device 10 includes a central processing unit (CPU) 11, memory 13 (such as RAM) for storing programs and instructions used by CPU 11 and other components, a graphics controller 15 for controlling video screen 12, a transceiver 17 for engaging in network communication (such as using wireless links such as Bluetooth, WiFi, 3G, 4G, etc. or wired links such as Ethernet), and a non-volatile storage device 19 such as a hard disk drive, flash memory, or other storage. CPU 11, memory 13, graphics controller 15, transceiver 17, and non-volatile storage 19 optionally are mounted on a printed circuit board (not shown) and are electrically coupled to one another. Computing device 10 typically will contain other hardware components that are not shown.

Figure 3:
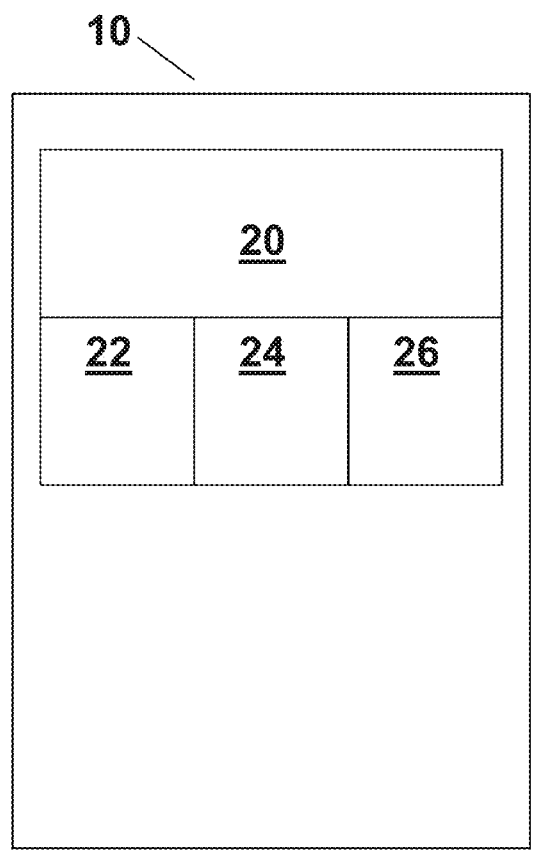
FIG. 3 is a depiction of exemplary software components of a computing device.

FIG. 3 depicts exemplary software components of exemplary computing device 10. In this example, computing device 10 optionally includes an operating system 20 (such as iOS® by Apple® Android® by Google®) for controlling the hardware and software operations of computing device 10 as well as input/output devices 16. Computing device 10 optionally includes web browser 22 for providing Internet browsing capabilities (such as Internet Explorer® by Microsoft®), multimedia application 24 for providing services such as playing video and audio content such as movies and music, and software application 26, which can be any type of application available for computing devices. These software components are merely illustrative.

Figure 4:
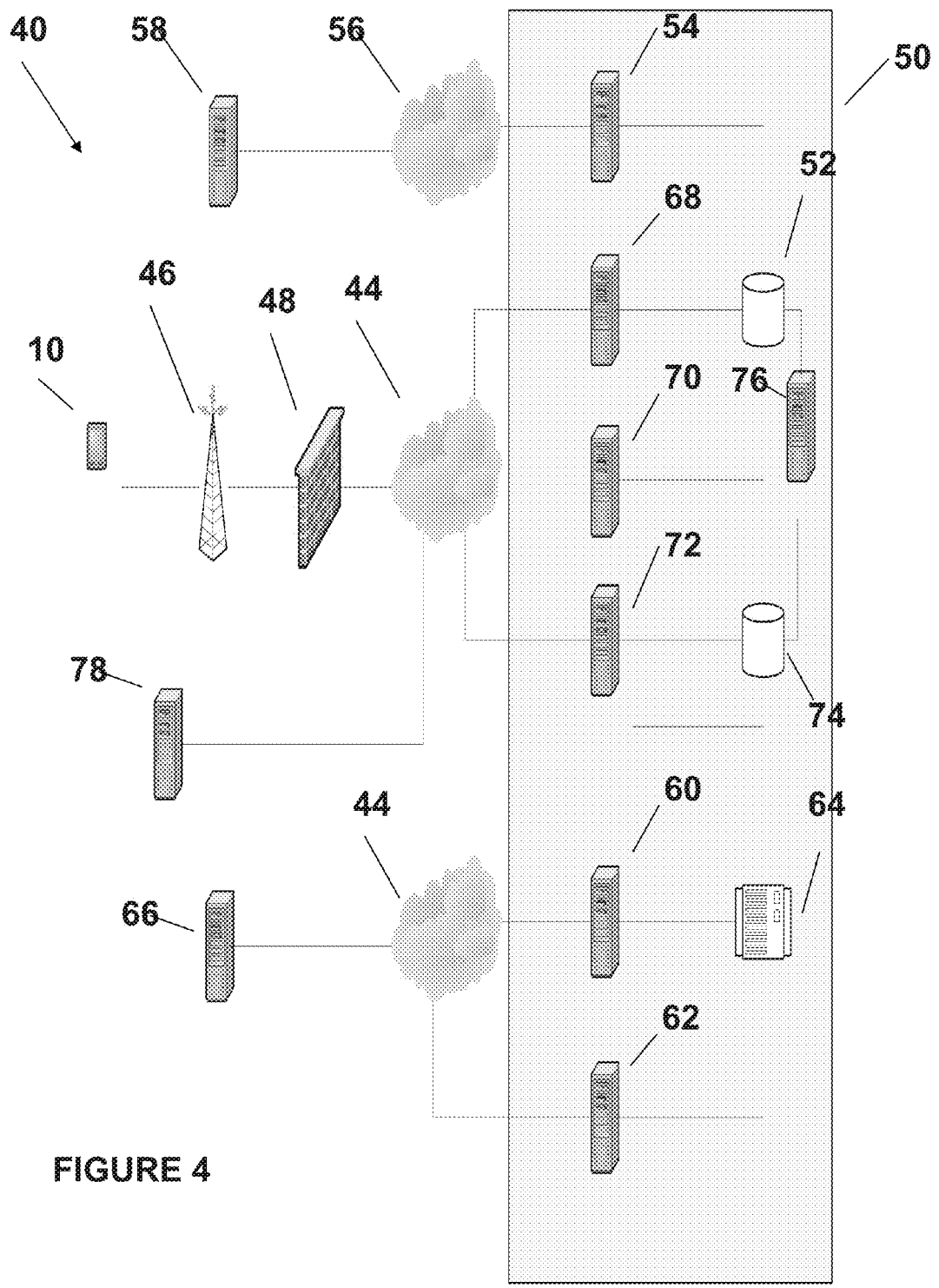
FIG. 4 is a block diagram of an exemplary computing device service system.

FIG. 4 depicts a typical computing device service system 40. The computing device service system 40 provides one or more services, such as movies, videos, sports information, music, ringtones, social networking services, GPS applications, etc. to a computing device 10 that includes multimedia application 24 or software application 26 (not shown in FIG. 4) that processes the incoming service data and displays the service data to the user of the computing device. In the example shown in FIG. 4, the computing device 10 couples to a communications link 44, such as the Internet, over a wireless network 46 and a firewall 48. The computing device service system 40 also has a service unit 50 that performs various functions and operations for the computing device service system. Wireless network 46 optionally can utilize Bluetooth, WiFi, 3G, 4G, or any other wireless connection.

The service unit 50 may include a user information storage unit 52 that stores information about each user of the computing device service system including user billing information and user service personalization information. The service unit 50 may also have a billing server 54 that performs a billing operation for the services provided to the user. In the example shown in FIG. 4, the billing for the services are communicated over a secure link 56, such as a secure socket layer (SSL) connection, to a carrier billing system 58 so that the computing device carrier can provide the bill for the services on the monthly invoice of the user of the computing device. Alternatively, the service unit 50 can directly bill the user. The service unit 50 may also include a live content ingester 60, a clip digester 62 and a content/asset storage unit 64 that handle the service content (such as music, movies, etc.) from a third party 66 that will be delivered by the computing device service system. Third party 66 optionally can he a record label or movie that owns the digital content utilized by service unit 50. The live content ingester receives any live content and processes it and then stores the live content in the content/asset storage unit 64 in various output encoding and file formats. The clip digester 62 receives non-live content and data, processes it and then stores the clips in the storage unit 64 in various output encoding and file formats.

The service unit 50 may further include a menu/personalization unit 68, a reporting unit 70, a content provisioning unit 72, a log database 74 and a data mining unit 76. The menu/personalization unit 68, the reporting unit 70, the content provisioning unit 72 and the data mining unit 76 may preferably each be server computers. The menu/personalization unit generates and delivers the computing device service user interfaces to the user that may also be customized by the user based on the customization information stored in the user information storage unit 52. The content provisioning unit 72 optionally may support the real-time streaming protocol (RTSP) and the hypertext transfer protocol (HTTP) and may deliver or stream the service content to the computing device over the link 44. The content provisioning unit 72 may request the service content from the content store 64 and may store service content information in the log store 74. The reporting unit 70 may generate a report about various aspects of the service unit and its operations. The data mining unit 76 collects user behavior information which is then mined to determine any recommendations and personalizations for users of the system.

A user of computing device 10 can run multimedia application 24 or software application 26 to listen to music, an audiobook or eBook, or other audio programming or to watch a movie, TV show, or other video content streamed or transmitted from content provisioning unit 72. In one embodiment, content provisioning unit 72 will send digital content to the computing device 10 and will also send metadata to the computing device 10. Digital content can include digital video, audio, images, text, or any other data in digital form. The metadata can include information such as the title of the song or video, the duration of the song or video, etc. The metadata also can include a URI, for a website housed on third-party server 78 that offers products for sale that are relevant to the content being streamed to computing device 10. Examples of such products might include ringtones that contain the same music being streamed to computing device 10, CDs containing the same music, DVDs containing the video being streamed to computing device 10, etc.

Computing device 10 typically utilizes a system clock that is implemented by operating system 20. For UNIX systems, the system clock typically is implemented as a count of the seconds that have elapsed since Jan. 1, 1970. For Microsoft Windows systems, the system clock typically is implemented as a count of the number of 100-nanosecond ticks since Jan. 1, 1601. Other known mechanisms exist for implementing the system clock and the disclosure is not limited to any particular implementation of the system clock. The system clock can be used to derive the current date and time. Absent modification, a system clock typically is reliable and accurate. However, it is possible for skilled programmers to "hack" the system clock to alter it (clock skew). This can be problematic when the rights to play digital content are purchased only for a certain rental window and/or play window.

Figure 5:
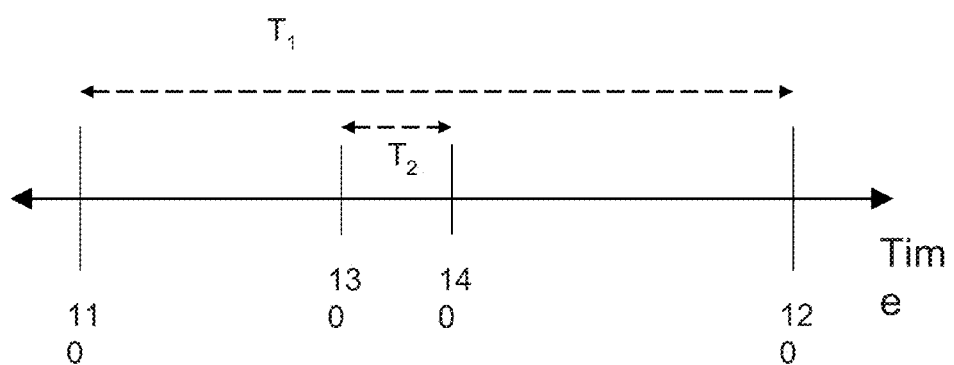
FIG. 5 is a depiction of an embodiment that maintains the integrity of temporal rental windows and play windows in which digital content can be played.

One embodiment of the digital rights management system that handles clock skew will now be described with reference to FIG. 5. When the user purchases a license to digital content for a certain rental window and/or play window, software application 26 will store the date and time of the purchase (using the system clock) and also immediately will calculate the date and time at which the user's rights to that digital content will expire. For example, with reference to FIG. 5, a user might purchase digital content at time 110 (which corresponds to a specific date and time). That purchase will have a certain rental window of time associated with it, such as 7 days. Based on that rental window parameter, software application 26 will calculate the date and time at which the right will expire. Here, the rental window of time is time $T_1$, which can be 7 days, etc., and the expiration date and time will be time $110+T_1$, which is noted here as time 120. The purchase also will have a play window associated with the purchase that will represent the amount of time in which the user has to interact the digital content once he or she starts the digital content. Here, the user starts interacting with the digital content (for example, starts watching a video) at time 130. The play window has a predetermined amount of time, here $T_2$, after which the rights will expire. Software application will store time 130, and will calculate the value of time $130+T_2$, which is noted here as time 140. Software application stores all four values—110, 120, 130, and 140, in memory 13 and/or non-volatile storage 19.

Once a purchase is made and time values 110, 120, 130, and 140 are stored in computing device 10, if the user changes the system clock of computing device 10, software application 26 will not permit the user to increase the amount of time with which he or she can interact with the digital content or will disable playback of the digital content altogether. For example, in one embodiment, if the user previously purchased the digital content at time 110 and then changed the system clock to a time prior to time 110, such as time $110-T_3$, then after that change is made, software application 26 will recognize that the user's right to view the digital content has not yet been triggered because time 110 has not yet occurred based on the now erroneous system clock. Specifically, the user will need to wait a time interval of $T_3$ before he or she will be able to start interacting with the digital content. In another embodiment, if software application 26 determines that the current system clock value is actually before time 110 (which would not happen absent alteration of the system clock), then software application 26 can refrain from playing the digital content at all and optionally can display a warning message to the user and/or send a message to service unit 50 indicating that the system clock on computing device 10 has been tampered. This would allow service unit 50 optionally to terminate all services provided to computing device 10 or its user.

If the user instead had purchased the digital content at time 110 and started watching the digital content at time 130, then changed the system clock to an earlier point by an amount $T_3$, software application 26 can disable playback of the digital content. In one embodiment, if software application 26 determines that the current system clock value is actually before time 130 (which would not happen absent alteration of the system clock), then software application 26 can refrain from playing the digital content at all and optionally can display a warning message to the user and/or send a message to service unit 50 indicating that the system clock on computing device 10 has been tampered. This would allow service unit 50 optionally to terminate all services provided to computing device 10 or its user.

Figure 6:
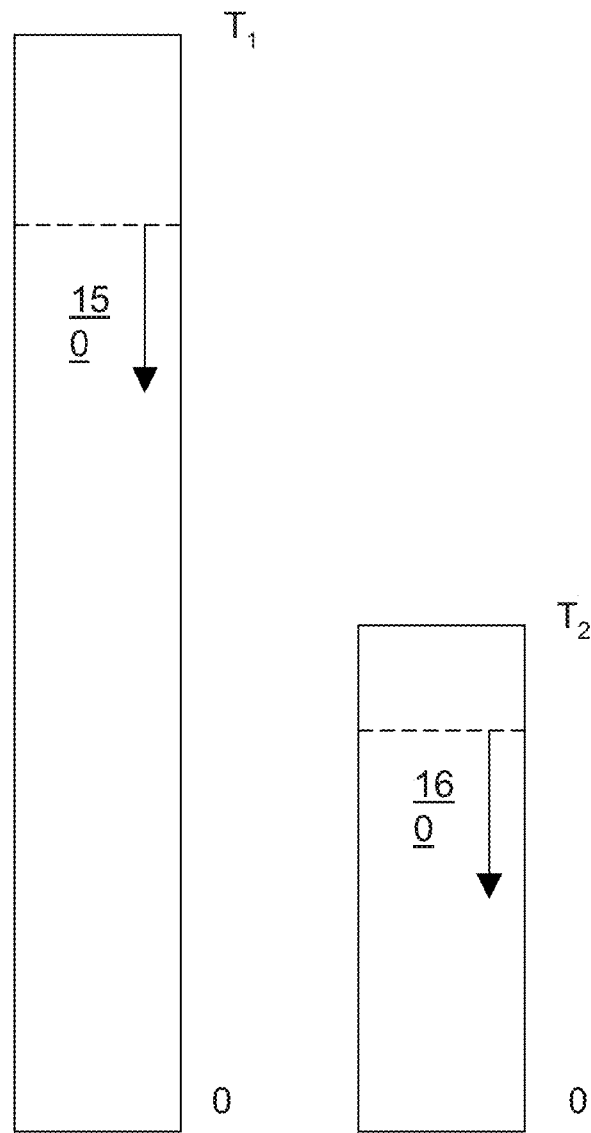
FIG. 6 is a depiction of an embodiment that prevents a computing device from obtaining digital data if its system clock has been altered.

In another embodiment shown with reference to FIG. 6, software application 26 can maintain elapsed rental window value 150 and elapsed play window value 160. Elapsed rental window value 150 will start at the full value of the rental window (e.g., 7 days or $T_1$) and will be decremented in real time. Elapsed rental window value 160 will start at the full value of the play window (e.g., 24 hours or $T_2$) and will be decremented in real time once play of the content begins, this manner, elapsed rental window value 150 and elapsed rental window value 160 will represent absolute countdown values. Once either value reaches 0, software application 26 will cease playback of the digital content. Once the elapsed rental window value 150 and elapsed play window 160 are established, any changes made to the system clock will not affect those values and will not enable a user to lengthen the effective play time of the digital content. Elapsed rental window value 150 and elapsed play window value 160 can be stored in memory 13 and/or non-volatile storage 19.

Another embodiment will now be described with reference to FIG. 7. Software application 26 is installed on computing device 10 (step 200). Software application 26 then will create a log file that is stored in memory 13 and/or non-volatile storage 19, and will store the current system clock value $C_1$ (or an equivalent value, such as date and time) in the log file (step 210). Thereafter, at periodic intervals during operation of software application 26, software application 26 will store the current system clock value $C_t$, (or an equivalent value) in the log file (step 220). When software application 26 is initiated and/or when mobile 10 is booted up, software application 26 will compare the current system clock value $C_T$ (or an equivalent value), which it obtains from software application 26, against the previous entry $C_{T-1}$ in the log file (step 230). If software application 26 detects a discrepancy during step 230 (such as $C_T$ being smaller than $C_{T-1}$), software application 26 will store warning data 300 indicating the discrepancy (step 240). Thereafter, if software application 26 requests digital content from service unit 50 for playback or storage, service unit 50 can deny the request or alter the digital content sent to software application 26 based on warning data 300 (step 250). Warning data 300 optionally can comprise a string of data following a predetermined format understood to both software application 26 and service unit 50 that indicates the nature of the discrepancy. It also optionally can comprise a flag, an interrupt signal, or register bits.

While the foregoing has been with reference to particular embodiments, it will be appreciated by those skilled in the art that changes in these embodiments may be made without departing from the principles and spirit of the disclosure, the scope of which is defined by the appended claims.

The invention claimed is:

1. A method for playing digital content, comprising the steps of:
    receiving a particular piece of rental digital content;
    determining, by a processing unit within a computing device, a beginning of a rental window for the particular rental digital content;
    storing the beginning of the rental window value within a storage device within the computing device;
    determining, by the processing unit, an end of the rental window for the particular rental digital content;
    storing the end of the rental window value within the storage device;
    determining, by a processing unit within a computing device, a beginning of a play window for the particular rental digital content;
    storing the beginning of the play window value within the storage device;
    determining, by the processing unit, an end of the play window for the particular rental digital content, wherein the play window is shorter in length than the rental window;

storing the end of the play window value within the storage device;

playing the particular rental digital content on the computing device only during the time period between the beginning and end of the rental window and between the beginning and end of the play window; and determining whether a system clock of the computing device has been tampered with by comparing a current clock value of the system clock against one or more of: the beginning of the rental window value and the beginning of the play window value, wherein a request to play the particular rental digital content is denied if the system clock has been tampered with.

2. The method of claim 1, wherein determining whether a system clock of the computing device has been tampered with comprises:

monitoring clock values of the system clock at periodic intervals; and determining whether a current clock value of the system clock is earlier than a previous clock value.

3. The method of claim 1, wherein the particular piece of rental digital content comprises at least one of video content and audio content.

4. The method of claim 1, further comprising providing, by a server, the beginning of the rental window to the computing device.

5. The method of claim 4, wherein the providing step occurs over a wireless network.

6. The method of claim 1, wherein the computing device is a mobile device.

7. The method of claim 2, further comprising:

denying a request to play the particular rental digital content when a current clock value of the system clock is earlier than one of the beginning of the rental window value and the beginning of the play window value.

8. The method of claim 5, wherein the wireless network comprises one of a 3G network and a 4G network.

9. A computing device for playing digital content, comprising:

a processing unit that is configured to determine a beginning of a rental window, an end of the rental window, a beginning of a play window, and an end of the play window; and a storage device for storing values for the beginning of the rental window, end of the rental window, beginning of the play window, and end of the play window;

wherein the processing unit is further configured to play a particular piece of rental digital content on the computing device only during the time period between the beginning of the rental window and end of the rental window and between the beginning of the play window and the end of the play window;

wherein the processing unit is further configured to determine whether a system clock of the computing device has been tampered with by comparing a current clock value of the system clock against one or more of: the beginning of the rental window value and the beginning of the play window value; and wherein a request to play the particular piece of rental digital content is denied if the system clock has been tampered with.

10. The system of claim 9, wherein determining whether a system clock of the computing device has been tampered with comprises:

monitoring clock values of the system clock at periodic intervals; and determining whether a current clock value of the system clock is earlier than a previous clock value.

11. The system of claim 9, wherein the particular piece of rental digital content comprises at least one of video content and audio content.

12. The system of claim 9, wherein the computing device is configured to obtain a value for the beginning of the rental window from a server over a network.

13. The system of claim 12, wherein the network comprises a wireless network.

14. The system of claim 9, wherein the computing device is a mobile device.

15. The system of claim 13, wherein the processing unit is further configured to deny a request to play the particular piece of rental digital content when a current clock value of the system clock is earlier than one of the beginning of the rental window value and the beginning of the play window value.

16. The system of claim 13, wherein the wireless network comprises one of a 3G network and a 4G network.

* * * * *